United States Patent Office 2,934,431
Patented Apr. 26, 1960

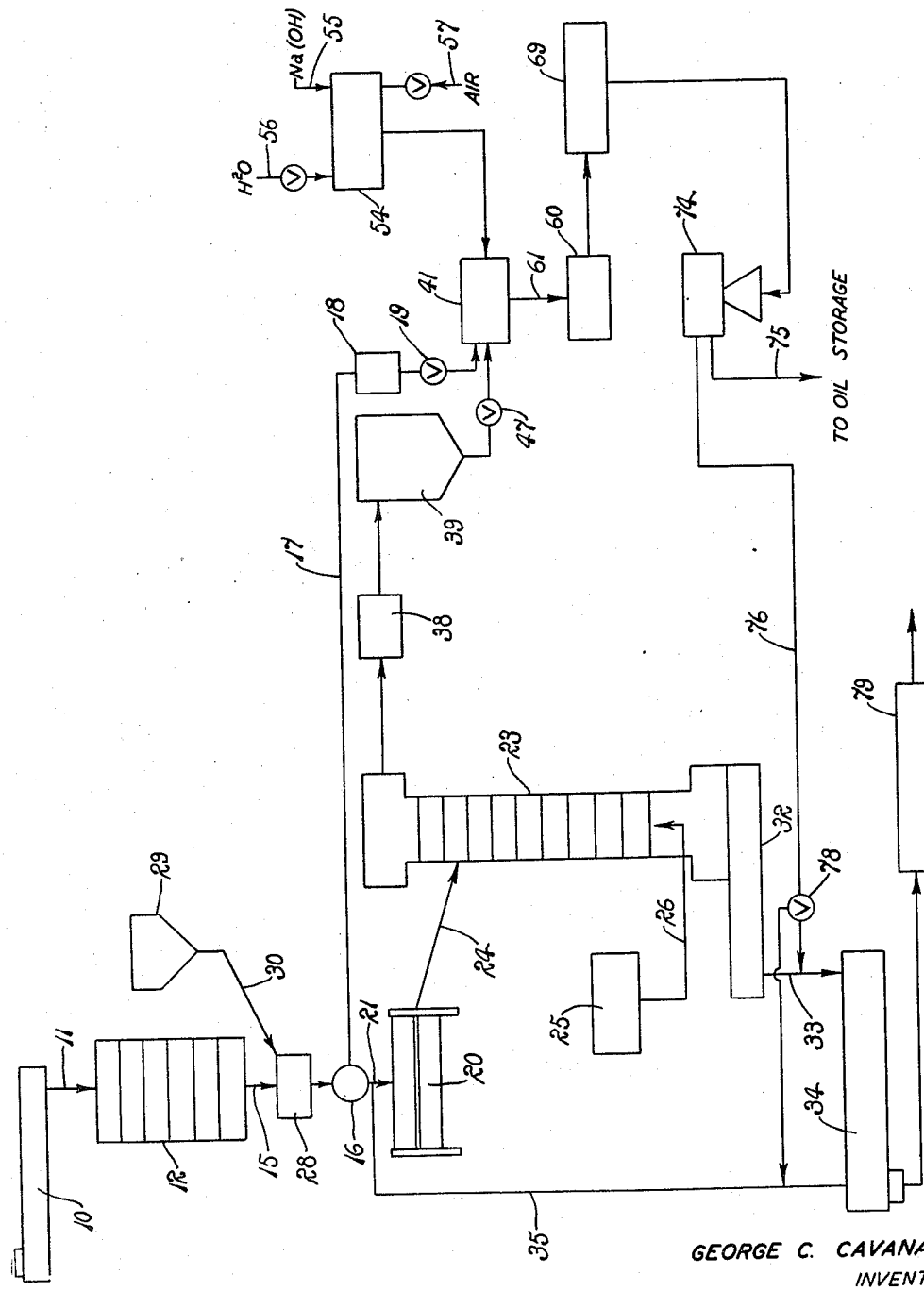

2,934,431

PROCESS FOR FORMING MEAL FROM COTTONSEED EDIBLE BY ANIMALS AND POULTRY

George C. Cavanagh, Fresno, Calif., assignor to Ranchers Cotton Oil, Fresno, Calif.

Application September 9, 1957, Serial No. 682,925

14 Claims. (Cl. 99—2)

The present invention relates to organic livestock feeds and more particularly to an improved process for forming meal from cottonseed which is edible by animals and poultry and possesses improved nutritive value. The instant application constitutes a continuation-in-part of my co-pending application Serial No. 370,734, filed July 28, 1953, now abandoned, entitled "Organic Cattle Feed and Process for Forming the Same."

Livestock feed is normally an important by-product of the vegetable oil industry. However, the marketing of residue which results from the extraction of oil from cottonseed has proved a difficult problem. While being of some advantage as a source of protein when fed to ruminant animals, it has been regarded as entirely unusable for laying hens and even meat poultry. Conventional cottonseed meal when fed to meat poultry tends to reduce the bone marrow, inhibit growth and cause the spleen to harden. When such cottonseed meal is fed to laying hens, the yolks of their eggs become green, an unattractive and generally unmarketable condition.

As amply supported in the evidence submitted in connection with the identified co-pending application, the subject invention has been known to be highly advantageous but until recently it has been impossible to supply as detailed analytical data as desired. Testing techniques have not been available which are sufficiently accurate and provide results sufficiently rapidly to permit detailed analysis and evaluation of vegetable meals as animal and poultry feed. For example, one procedure for testing livestock feeds on poultry has been to feed hens at a 5% or 10% dietary level on the meal to be tested and to store the eggs from the hens at a temperature of from approximately 35° C. to 40° C. for three months, after which the eggs are visually examined for discoloration. This test clearly reveals that a dietary level of substantially less than 5% of conventional cottonseed meal results in discoloration of the egg yolks. This is believed due to the creation of a form of cephalin-gossypol complex in the yolks. However, chemically and biologically things occur in the maturation of cottonseeds and their digestion by livestock which cannot be explained with certainty. In this particular test, it is adequate to know that the turning of the egg yolks green indicates the presence of toxic principles which are present to an objectionable extent in cotton seed. Whether such toxic principles are gossypol or other materials need not be of concern. While this test has been the best available until recently, it has been too cumbersome extensively to employ and although it has been possible by these and other tests to determine that superior livestock feeds were being produced by the applicant from cottonseed it has been impractical to determine precisely the cause thereof.

Recently, a new technique has been developed for evaluating cottonseed meal with respect to possible egg yolk discoloration. This new process, developed by Dr. Grau of the University of California, has permitted speedy and economical evaluation which has enabled the applicant now, for the first time, to designate the specific features of his invention which are responsible for the synergistic effects attained. The process is so sensitive that 1% or less of conventional cottonseed meal can easily be detected in a laying hen ration by analysis of the hens' egg yolks. This combined biological and chemical analysis is fully described in Agricultural and Food Chemistry 2982 (1954) by Dr. C. R. Grau, E. Allen, M. Nagumo and C. L. Sweigart.

As set forth in the designated co-pending application, it has been discovered by the applicant that the pre-treatment of moist cottonseed meats with soda ash, subsequent to cooking and comminuting but prior to oil extraction, results in a cottonseed residue of improved nutritional value for livestock. Also as described in that application, it has been discovered by the applicant that it is beneficial to treat cottonseed meal by the addition of soapstock thereto. Such treatment has not only resulted in improved nutrient value and lowered toxic principal content but in improved physical properties avoiding excessive dust and permitting ready pelleting. The broad essence of the present invention resides in the discovery that the described soda ash pre-treatment followed by the addition of caustic soda soapstock achieves a synergistic effect in converting the toxic principles of cottonseed into non-toxic materials to an extent far greater than the aggregate individual effects of the soda ash and soapstock treatments when performed on different meals.

An object of the present invention is to provide an improved cottonseed meal for animal and poultry feed.

Another object is to provide an improved process for producing meal from cottonseed which is edible by animals and poultry.

Another object is to improve the nutrient value of livestock feed formed from the residue resulting from cottonseed oil extraction processes.

Anther object is to provide a cottonseed meal that is substantially free from toxic principles.

Another object is to make possible the feeding of cottonseed meal to animals and poultry in quantities up to 10% or more of their dietary levels without harmful effects and more specifically to make it possible to feed meat poultry and laying hens cottonseed meal without minimizing their growth, reducing their bone marrow, harming their spleens or discoloring their egg yolks.

Another object is to provide an improved feed of the character described and process for forming the same which utilizes constituents of the cottonseed to bind particles of the resultant meal into conveniently handled form and which increases the nutritional value of the feed.

Further objects and advantages will become more fully apparent in the subsequent description in the specification.

The drawing is a schematic diagram illustrating the practice of the process of the present invention which may be performed with any suitable equipment but which is conveniently illustrated in conjunction with my process for the "Extraction and Refining of Glyceride Oils and Fats From Source Material Thereof," comprising the subject matter of my United States Patent No. 2,789,120.

In the drawing, a screw conveyer or other suitable means for supplying a continuous flow of cottonseeds is represented generally at 10. The conveyor has an outlet 11 which is connected to a standard five ring cooker 12. It is understood that the conveyer is a convenient means for delivering in continuous flow comminuted cottonseed from which it is desired to extract oil and produce livestock feed. Any other suitable means for performing the function may of course be utilized.

As employed herein, the term "comminuted" is intended to include the results of any operation by which the cottonseed is reduced to minute particle size for access to the oil, free fatty acids, lecithin, waxes, gums, color bodies, gossypol and other materials contained therein. Grinding, flaking, crushing, shearing, slicing, and other operations are well known for the purpose.

The cooker 12 provides a discharge 15 connected for the gravitational flow of cooked comminuted cottonseeds to a pre-press 16 or other suitable means for pre-compressing initial quantities of the oil from the cottonseed. As will subsequently be appreciated all extracted oil can be removed by the pre-press, if it is desired to avoid further extracting operations. Pre-press expeller oil is delivered by a conduit 17 from the pre-press to an expeller oil head tank 18 provided wtih an outlet control valve 19. Pre-pressed cottonseed, usually referred to following the pre-press 16 as "meal" and which normally contains approximately 8 to 14% oil by weight, is delivered from the pre-press to flaking rolls by a meal duct 21. It will also be understood that the pre-press 16 may be eliminated entirely and the comminuted cottonseeds delivered directly to the flaking rolls 20. The cottonseed which is comminuted prior to delivery to the cooker is in moist particle form when delivered therefrom and is further comminuted by the action of the pre-press 16 and the flaking rolls 20.

A conventional extracting column is represented at 23. A delivery pipe 24 is extended from the flaking rolls 20 to an upper portion of the extracting column and serves to deliver the meal in flaked-cake form from the rolls to the column. Any suitable source 25 of solvent, such as normal hexane, is connected to the lower end portion of the extracting column 23 by a solvent supply line 26, in the well known manner.

The structure described to this point is entirely conventional and a considerable portion of the remainder of the apparatus to be described will likewise be recognized as conventional. However, it will be recalled that a significant phase of the present invention is the application of soda ash to the moist cooked comminuted cottonseed prior to the extraction of oil therefrom. This is conveniently accomplished by the provision of a regulating apparatus 28 in the discharge 15 of the cooker 12 which serves to add the soda ash to the comminuted cottonseed at a rate of from .1% to 5% (solid basis) of the weight of the cottonseed being processed. The feed regulating apparatus may take innumerable forms but is conveniently an electrically operated vibratory feed of the well known form which is readily controlled by varying the electrical supply thereto. The feed regulating apparatus is connected to a hopper 29 by a feed line 30. The only alkaline salt which is capable of achieving the synergistic effect of the present invention now known is soda ash. While the soda ash may be applied in solution it is found far superior to apply this material in dry form. The superiority of dry soda ash as compared with the employment of this material in solution is readily demonstrable but the full explanation is not known. It is believed that the application in dry form to the moist material insures a protracted chemical reaction of the soda ash with the toxic principles of the cottonseed rendering said toxic principles partially detoxified and sufficiently water soluble to have an affinity for the moist particles of the meal.

Comminuted cottonseed pre-treated with the soda ash, flaked between rolls 20 is delivered by the pipe 24 to the extracting column 23. As solvent from the tank 25 passes upwardly through the extracting column in the well known manner, the solvent removes oil from the cottonseed and the cottenseed residue thereafter descends in the extracting column containing the toxic principles of the cottonseed which have been partially detoxified by the soda ash. While my designated United States patent describes the gossypol of the cottonseed as being converted to non-toxic combined gossypol recent testing techniques have cast doubt on whether or not the toxic principles are essentially gossypol. It is therefore, specifically to be understood that the expression "toxic principles" is intended to include the toxic constituents of the cottonseed whether actually gossypol or not. For example, it has been shown that gossypol is associated in the cottonseed with several related toxic compounds. One or more of these may actually be responsible for most of the observed toxicity. Pigment glands separated from cottonseed which are 30% to 50% gossypol are found to be more toxic than purified gossypol.

Cottonseed residue from the extracting columns 23 is removed by a screw conveyer 32 and delivered through a pipe 33 to a drier 34 where the moisture and solvent contained therein are removed. Such driers are well known and not described in greater detail herein.

Similarly, soda ash pre-treated cottonseed residue may be delivered by a residue conduit 35 to the dryer 34.

Mixed oil and solvent in miscella form is passed from the extracting column 23 through a filter 38 and delivered to a miscella head tank 39. Even though the soda ash pre-treatment is known to react with substantial portions of the free fatty acids in the cottonseed particles and to render them water soluble so that they have an affinity for the moist particles, the miscella in the head tank 39 and the oil in the head tank 18 also contain fatty acids.

A proportionometer is shown at 41. The proportionometer may be fed with oil from the oil head tank 18 under regulated flow through the valve 19 or with miscella from the head tank 39 under regulated flow through the valve 47.

A caustic soda tank 54 adapted to contain caustic soda solution is also connected to the proportionometer 41. The tank is provided with a caustic soda supply duct 55, a water supply duct 56 and an air supply 57 of any suitable forms, as are well known in the art. The proportionometer is adjustable to regulate proportions of mix of caustic soda from the tank 54 with expeller oil or miscella from the tanks 18 or 39. From 1% to 10% lye of from 4% to 25% concentration is sufficient.

By proper regulation of the valves 18 and 47, oil from the tank 18 and/or miscella from the head tank 39 is delivered to the proportionometer 41 where it is mixed with caustic soda solution from the tank 54. An homogenizer 60 receives the oil or miscella accompanied by the caustic soda through a delivery line 61. The homogenizer provides a capacity greater than the supply capacity of the line 61 and is preferably equipped with the re-cycling conduit, not shown. The oil or miscella with the caustic soda is re-cycled through the homogenizer for a period of from 15 to 90 seconds.

For example, in a commercial extracting and refining plant utilizing the process of the present invention the line 61 has a capacity of from 5 to 18 gallons per minute while the homogenizer has a positive displacement of approximately 20 gallons per minute. This enables the homogenizer to re-cycle the mixture therethrough for the desired period and without additional heat the homogenizer is able to agglomerate soapstock formed in the oil or miscella by the caustic soda and achieve a suitable "break" in the few seconds it is recycled rather than in the 20 to 30 minutes during which caustic soda is reacted upon oil in conventional caustic soda refining processes.

The quantity of caustic soda delivered to the proportionometer 41 is so regulated that it is sufficient to saponify substantially all of the free fatty acids contained in the oil or miscella with a slight excess of caustic soda remaining. After the mixture has been re-cycled in the homogenizer to facilitate the saponification of the free fatty acids in the oil or the miscella, the mixture is directed through an economizer section 69 of a heat exchange device wherein the mixture is successively subject to heating and cooling. The economizer serves to break the three-phase system of the mixture flowing from the homogenizer 60 into a two-phase system preconditioned for separation of the soapstock from the remainder of the mixture by centrifugation or other means. From the economizer, the mixture including the soapstock is delivered to a centrifuge 74 where the soapstock is removed from the mixture and the remaining oil or miscella directed through the conduit 75 to storage. The separated soapstock containing small quantities of solvent adhering thereto is directed through a conduit 76 to the pipe 33 or the pipe 35 dependent upon the source of the cottonseed residue being delivered to the drier 34 after extraction of the oil. A valve 78 provides the requisite control of the directing of the soapstock. In the drier, the soapstock and particles of cottonseed residue from the extracting column 23 or the press 16 are thoroughly mixed. Although the major portions of the oil are removed from the residue it still contains small quantities thereof and other nutrient materials of substantial value. The residue from the press 16 normally contains substantially greater quantities of oil than the residue from the extracting column 23. However, the particles of residue from the extracting column are saturated with solvent which facilitates the mixture of the soapstock therewith. In both events, the minute quantities of solvent adhering to the soapstock upon delivery to the residue facilitate distribution of the soapstock throughout the residue. The amount of soapstock utilized preferably approximates 1% by weight of the residue. However, greater quantities may be utilized but the total soapstock employed should not exceed 8% by weight because of handling problems which then result. Once the soapstock has been thoroughly mixed with the residue pre-treated with the soda ash, as described, the solvent is vaporized from the resultant meal. Thereafter, the meal is ready for consumption and may be employed in meal form or directed through a pelletizing apparatus 79 if the feed is preferred in pelleted form.

It is noted that there is a chemical change which occurs in the residue after the addition of the soapstock thereto containing the slight excess of caustic soda. Immediately after the addition of the soapstock, the characteristics of the meal are substantially less valuable than after the chemical modification occurs. Actually, the chemical change will occur after a substantial period even under normal room conditions but not nearly as rapidly nor as fully effectively as when the environment of the residue and soapstock is regulated for a period to achieve the modification. Thus, greatly improved results are attained if the mixture in the dryer 34 is maintained for a period of at least 20 minutes at a temperature of from approximately 210° F. to approximately 230° F. and under a pressure of approximately five pounds per square inch. At the end of this period the meal has normally attained the full advantages of the present invention. In some instances the temperature and pressure are maintained for 30 minutes or so. However, excessive protraction of such treatment leads to deleterious side effects.

The soapstock added to the meal not only eliminates the dust-like properties thereof but also provides the binder for pelletizing purposes. Further, it improves the nutrient properties of the resultant feed. Resulting from the saponification of the free fatty acids, the soapstock is economical, conveniently accessible, and has proved a convenient inexpensive and highly desirable expedient for improving the meal for livestock feed.

It should not be inferred that since the utilization of the soda ash and the application of the caustic soda soapstock to the residue are successive steps performed in time spaced relation that there is no co-action or significant relation. Actually there is a remarkable synergistic effect that is readily demonstrable. In order to assure absolute objectivity in testing the results of the soda ash pre-treatment, the results of the caustic soda soapstock addition, and the results of both steps, an homogeneous quantity of comminuted cooked cottonseed meats was divided into two equal portions identified as portions A and B.

One percent by weight of solid soda ash was added to portion A and intimately mixed therewith. Subsequently, the oil was extracted from portion A with normal hexane. Portion B received no treatment whatsoever prior to the extraction of its oil with normal hexane in precisely the same manner. Portion A was then divided into equal quantities designated as samples A–1 and A–2. Similarly, portion B was divided into equal quantities designated B–1 and B–2. B–1 was tested for free gossypol in accordance with the regulations of American Oil Chemists official method Ba 7–50 and was found to contain 0.1125% free gossypol. Sample A–1 was similarly tested and found to contain 0.1063% free gossypol. This demonstrated a reduction in free gossypol incident to the utilization of the solid soda ash of 0.0062%. Sample B–2 had 5% caustic soda soapstock of the free fatty acids of cottonseed added thereto in the presence of sufficient hexane to achieve uniform disbursal in accordance with the teaching of the present invention and was dried by stirring on a steam bath to volatilize the hexane. The resultant material was tested for free gossypol and found to contain 0.10625%. This obviously demonstrated that the employment of the caustic miscella refining soapstock reduced the free gossypol by 0.00625%. This in itself is a new and surprising contribution to the art. It is well known that the gossypol, being water soluble after treatment, usually concentrates in the soap. Thus, it would be expected that the addition of the soap would increase the free gossypol content of the meal rather than decreasing it in the manner achieved. Sample A–2 was treated with 5% caustic miscella refined soapstock in precisely the same manner as that described for sample B–2. The resultant material was found to contain 0.0887% free gossypol. From the foregoing it is evident that the described soda ash treatment reduced the free gossypol .0062% of the total weight of the material employed. The treatment with caustic miscella refined soapstock reduced the free gossypol by 0.00625% of the material. From this, in the absence of any synergistic effect, the total reduction in free gossypol by the employment of both the soda ash and the soapstock would be expected to be 0.01065%. Actually, the employment of both the soda ash and soapstock achieve a reduction of 0.0238% of the gossypol in the total weight of the material. This is more than twice the expected amount and conclusively establishes the results of the synergism.

In order to demonstrate the usability of cottonseed meal produced in accordance with the present invention in the feeding of laying hens, a test was conducted by the Department of Poultry Husbandry of the University of California, College of Agriculture, Agricultural Experiment Station at Davis, California. The test results were first available on August 12, 1957. Samples of commercial meal produced in the manner described involving the soda ash pre-treatment of the cottonseeds, the removal of oil by both the pre-press 16 and the solvent extraction column 23 and the subsequent treatment with caustic soda soapstock, were selected and designated as meals numbered 4 through 8. It is to be understood that the meals were identical except selected at different times during commercial plant operation so as to insure that they resulted from various batches of cottonseed. Laying hens were fed at 5% and 10% dietary levels. Their eggs were then stored in a cold room at a temperature of from 35 to 50° C. for approximately three months. These eggs were examined on August 8, 1957 by George Wakabayashi of the designated university, who is an acknowledged expert in the conducting of such tests. All of the May eggs resulted from hens which had been on the designated diets at least ten days while the April eggs can be considered as basals since the hens had not yet then been fed the cottonseed meal of the present invention. The following is a full and complete report of the results of the test:

| Diet | Hen No. | Date Laid | Comment Upon Visual Inspection After 3 Mos. Storage |
|---|---|---|---|
| 5% IV | 11-21511 | Apr. 26 | Normal. |
| | | Apr. 29 | Do. |
| | | Apr. 30 | Do. |
| | | May 7 | Do. |
| | | May 8 | Do. |
| | | May 13 | Do. |
| | | May 14 | Do. |
| | 12-21503 | Apr. 27 | Do. |
| | | Apr. 28 | Do. |
| | | Apr. 30 | Do. |
| | | May 9 | Do. |
| | | May 12 | Do. |
| | | May 16 | Do. |
| 10% IV | 13-21531 | Apr. 28 | Do. |
| | | Apr. 29 | Do. |
| | | May 7 | Large mottle spot. |
| | | May 8 | Normal. |
| | | May 9 | Do. |
| | | May 13 | Small mottle spot. |
| | | May 13 | Normal. |
| | | May 14 | Do. |
| | 14-21501 | Apr. 27 | Do. |
| | | Apr. 28 | Do. |
| | | Apr. 29 | Do. |
| | | Apr. 30 | Do. |
| | | May 8 | Do. |
| | | May 11x | Do. |
| | | May 13 | Do. |
| | | May 14 | Do. |
| | | May 16x | Do. |
| | 15-16995 | May 8x | Do. |
| | | May 14 | Do. |
| | | May 16x | Do. |
| 5% V | 16-21502 | Apr. 27 | Do. |
| | | Apr. 28 | Do. |
| | | Apr. 29 | Do. |
| | | Apr. 30 | Do. |
| | | May 7 | Do. |
| | | May 9 | Do. |
| | | May 11x | Do. |
| | | May 13x | Do. |
| | | May 14 | Do. |
| | | May 16 | Do. |
| 10% V | 17-21508 | Apr. 29 | Small mottle spot transparent. |
| | | Apr. 30 | Do. |
| | | May 4 | Normal. |
| | | May 7 | Do. |
| | 18-17039 | Apr. 26 | Do. |
| | | May 3 | Do. |
| | | May 4 | Do. |
| | | May 8 | Do. |
| | | May 9 | Do. |
| | | May 11 | Do. |
| | | May 14 | Do. |
| | | May 16 | Do. |
| 5% VI | 19-16875 | Apr. 30 | Do. |
| | | May 2 | Do. |
| | | May 3 | Do. |
| | | May 4 | Do. |
| | | May 7 | Do. |
| | | May 7 | Do. |
| | | May 9 | Do. |
| | | May 10 | Do. |
| | | May 12 | Do. |
| | | May 16 | Do. |
| | 20-21532 | Apr. 26 | Do. |
| | | Apr. 29 | Do. |
| | | May 7 | Do. |
| | | May 8 | Do. |
| | | May 11 | Do. |
| 10% VI | 31-17017 | Apr. 27 | Do. |
| | | Apr. 28 | Do. |
| | | Apr. 30 | Do. |
| | | May 13 | Do. |
| | 32-16869 | Apr. 30 | Do. |
| | 33-21517 | Apr. 28 | Do. |
| | | Apr. 29 | Do. |
| | | May 7 | Do. |
| | | May 9 | Do. |
| | | May 14 | Do. |
| | | May 16 | Do. |
| 5% VII | 34-17055 | Apr. 26 | Do. |
| | | Apr. 27 | Do. |
| | | Apr. 29 | Do. |
| | | Apr. 30 | Do. |
| | | May 7 | Small transparent mottle. |
| | | May 9 | Normal. |
| | | May 11 | Small transparent mottle. |
| 10% VII | 35-17021 | Apr. 26 | Normal. |
| | | Apr. 27 | Do. |
| | | Apr. 29 | Do. |
| | | May 8 | Do. |
| | | May 9 | Do. |
| | | May 13 | Do. |
| | 36-21520 | Apr. 26 | Do. |
| | | Apr. 28 | Do. |
| | | Apr. 29 | Do. |
| | | May 6 | Do. |
| | | May 10 | Transparent mottle. |
| 5% VIII | 37-21509 | Apr. 28 | Bloody. |
| | | Apr. 30 | Normal. |
| | 38-51507 | Apr. 28 | Do. |
| | | Apr. 29 | Do. |
| | | May 6 | Do. |
| | | May 7 | Do. |
| | | May 8 | Do. |
| | | May 12 | Do. |
| | | May 13 | Do. |
| | | May 17 | Do. |
| 10% VIII | 39-21512 | Apr. 26 | Do. |
| | | Apr. 27 | Do. |
| | | Apr. 28 | Do. |
| | | Apr. 30 | Do. |
| | | May 7 | Do. |
| | | May 8 | Do. |
| | | May 11 | Do. |
| | | May 18 | Do. |
| | 40-16982 | Apr. 26 | Do. |
| | | Apr. 27 | Do. |
| | | Apr. 29 | Do. |
| | | Apr. 30x | Do. |
| | | May 9 | Do. |
| | | May 10 | Do. |
| | | May 17 | Do. |
| | | May 18 | Do. |

The "x" after a date is used to indicate the egg was cracked.

It will be noted that not in a single instance was there any detectable turning of the egg yolks green even though the cottonseed meals to the extent of 5% and 10% dietary levels were employed.

Further tests employing the new Grau technique previously referred to have also been conducted entirely independently of the applicant on cottonseed of the Acala variety 4–42 having the following analysis:

|  | Percent |
|---|---|
| Moisture | 8.2 |
| Oil | 19.8 |
| Ammonia | 4.16 |
| Free Gossypol | 0.97 |
| F.F.A. | 0.5 |
| Total Lint | 12.2 |
| Grade | 110.0 |

(Moisture and oil free basis)

The cottonseed meats with added hulls to control the protein to 41% were flaked in five high rolls to 0.016" and cooked in a five high stack cooker, as represented at 12. Moisture content of the cooked meats at the discharge of the cooker was 12.6% and the temperature was 208° F. (98° C.). Granular soda ash was added to the cooked meats at the rate of 0.4% of the weight of the cooked meats prior to pre-pressing at 16. The resultant pre-pressed flake averaged 13.5% residual oil and the temperature of the pre-pressed flake at the press discharge was 207° F. (97° C.). The highest temperature to which the crude oil was exposed was 210° F. (99° C.) in the cooking and pre-press stages. The highest temperaure to which the meal was exposed was 235° F. (113° C.) at the discharge from the dryer 34.

The data in Table I shows the effect each stage of processing has on the meal. Commercially processed cottonseed meat-hull mixtures normally have an oil content of approximately 30%. Cooked meats before and after the addition of soda ash and pre-pressed flakes were extracted with normal hexane to obtain the meals shown in the first three columns of Table I. The meals from the extraction column 23, from the input of the dryer 34, and from the output of the dryer were used as they came for a commercial plant employing the process except that the meal taken directly from the extraction column was air dried to remove the hexane.

Table I shows a normal and reasonable reduction of gossypol in cooking. In the pre-pressing step after the addition of solid soda ash, and in the solvent extraction and meal drying stages, the decrease in free gossypol is marked and surprising when compared with conventional processes. The soapstock employed had a slight excess of caustic soda and supposedly contained considerable amounts of gossypol which had been removed from the oil by the alkali refining processes. Yet the data shows a normal decrease in free gossypol and also a decrease in pH in spite of the addition of the alkaline soapstock from miscella refining. This decrease in pH is attributed to the release of carbon dioxide when soda ash combines with the free fatty acids. This decrease occurs in spite of the natural buffering which is characteristic of vegetable materials of this type.

A.G.U. or Available Gossypol Units is a combined biological and chemical assay of the gossypol present in cottonseed meal which will combine with cephalin in egg yolks to form a cephalin-gossypol complex which is related to egg yolk discoloration.

Based on data and analyses obtained over a three year period, Dr. Grau and co-workers state that a cottonseed meal with A.G.U. of 0.25 or less can be safely fed to laying hens in amounts up to 10% of the total weight of the ration without egg yolk discoloration.

The last three columns of Table I show that in lowering the free gossypol 0.006% between the extraction column 23 and the dryer 34, the A.G.U. was lowered by 0.12. In lowering the free gossypol 0.014% between the input of the dryer and the output thereof, the A.G.U. was decreased by 0.23. No correlation between free gossypol and A.G.U. is necessarily implied by the relationship shown in these particular meals. Other meals tested show a lower A.G.U. with 0.04% free gossypol than was obtained with a meal analyzing 0.035% free gossypol.

soda ash pre-treatment creates a chemical action represented by the following formula.

$$Na_2CO_3 + 2CH_3(CH_2)_{14}COOH =$$
$$\text{Soda Ash} \quad \text{Palmitic Acid}$$
$$2CH_3(CH_2)_{14}COONa + H_2O + CO_2$$
$$\text{Sodium Palmitate} \quad \text{Water} \quad \text{Carbon Dioxide}$$

It will be recalled that there is an excess of caustic soda in the soapstock returned to the meal. The reaction which then ensues may be in accordance with the following formula.

$$NaOH + CO_2 = NaHCO_3$$
$$\text{Caustic Soda} \quad \text{Carbon Dioxide} \quad \text{Sodium Bicarbonate}$$

While the foregoing represents a postulation of a portion of the chemical activity involved, it will of course be understood that the present invention is in no way limited to this interaction which may subsequently in fact prove to be inaccurate or substantially less than a full reflection of the results attained.

While the instant invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

Having described my invention, what I claim as new and desire to secure by Letters Patent is:

1. A process for forming meal edible by animals and poultry from cottonseed containing toxic principles comprising cooking comminuted cottonseed, mixing dry soda

TABLE I

*Comparative analysis of meats and meal through various stages of plant processing*

| | Cooked Meats | Cooked Meats + Soda Ash | Pre-pressed Flakes | Meal From Extraction Column 23 | Meal From Input of Dryer 34 | Commercial Meal From Dryer Output |
|---|---|---|---|---|---|---|
| Moisture _____percent__ | 8.9 | 7.5 | 9.3 | 9.3 | 8.5 | 7.3 |
| Oil _____do____ | 1.0 | 1.0 | 1.7 | 0.6 | 1.2 | 0.9 |
| Protein _____do____ | 38.98 | 39.41 | 40.13 | 38.92 | 42.09 | 40.50 |
| Free Gossypol _____do____ | 0.225 | 0.229 | 0.077 | 0.064 | 0.058 | 0.044 |
| Nitrogen Solubility ____do____ | 65.2 | 61.6 | 76.2 | 80.9 | 67.7 | 78.9 |
| pH | 6.7 | 7.1 | 6.9 | 6.9 | 6.6 | 6.6 |
| A.G.U. | | | | 0.58 | 0.46 | 0.23 |

The various tests conducted involving cottonseed meal produced in accordance with the present invention clearly establish that the process has increased the nutrient value of cottonseed meal while effectively eliminating the toxic principles. As noted, cottonseed meal so produced can be fed to laying hens at least in quantities up to 10% of their dietary level, and perhaps more, without forming the green cephalin-gossypol complex. Not only is it established that the described pre-treatment of cooked comminuted cottonseed particles with soda ash reduces the toxicity of the toxic principles in the particles and that the described application of caustic soda soapstock containing a slight excess of caustic soda also reduces the toxicity of the toxic principles, but more significantly that there is a synergistic effect achieved by the successive application of both steps which renders cottonseed meal highly desirable as a livestock feed.

As initially stated, the chemical and biological processes are not entirely understood. However, it is noted that the soda ash and caustic soda soapstock treatments occur in a closed system and it is believed that the ash with the moist cooked cottonseed whereby the soda ash interacts with the toxic principles, extracting oil from the cottonseed subsequent to the mixing of soda ash with the cottonseed, and mixing caustic soda soapstock with the comminuted cottonseed previously treated with soda ash, there being a slight excess of uncombined caustic soda in the soapstock.

2. In the process of extracting oil from cottonseed including the steps of comminuting and cooking the cottonseed, extracting oil from the cottonseed by means of a solvent for the oil, and removing the extracted oil and solvent from the cottonseed residue, the steps for forming meal edible by animals and poultry from the residue comprising reacting dry soda ash on the cottonseed after it is cooked and before the oil is extracted, saponifying free fatty acids of the oil after it is extracted from the seed with a slight excess of alkali, separating the resultant soapstock from the oil with the excess alkali and with minute quantities of solvent adhering thereto, and substantially homogeneously mixing the soapstock and alkali accompanied by the solvent with the residue.

3. A process for forming meal edible by animals and poultry from cottonseed containing oil and toxic principles comprising cooking comminuted cottonseed, mixing .1% to 5% dry soda ash by weight with the moist cooked cottonseed, extracting the oil from the cottonseed subsequent to mixing the soda ash therewith, intimately mixing caustic soda soapstock with the cottonseed residue, there being a slight excess of uncombined caustic soda in the soapstock, and maintaining the resultant mixture at a temperature of from approximately 210° F. to 230° F. for at least about twenty minutes.

4. A process for forming meal edible by animals and poultry from cottonseed containing oil and toxic principles comprising cooking comminuted cottonseed, mixing dry soda ash with the moist cooked cottonseed whereby the soda ash interacts with the toxic principles rendering them water soluble so as to have an affinity for the moist cottonseed particles, extracting the oil from the cottonseed particles while leaving the interacted soda ash and toxic principles with the particles, saponifying free fatty acids in the extracted oil by mixing caustic soda with the oil in a quantity sufficient to provide a slight excess after said saponification, separating the soapstock thus formed and the excess caustic soda from the oil, and intimately mixing the soapstock with the excess caustic soda with the particles of cottonseed previously treated with the soda ash.

5. A process for forming meal edible by animals and poultry from cottonseed containing toxic principles, oil, and free fatty acids comprising cooking comminuted cottonseed, mixing from approximately .1% to 5% by weight of dry soda ash with the moist cooked cottonseed, extracting the oil and free fatty acids from the residue of the cottonseed after mixing the soda ash with the cottonseed, mixing caustic soda soapstock of free fatty acids of cottonseed with the cottonseed residue, the caustic soda soapstock having a slight excess of caustic soda therewith, and maintaining the temperature of the resultant mixture at a temperature of from approximately 210° F. to approximately 230° F. for at least about twenty minutes.

6. A process for forming meal edible by animals and poultry from cottonseed containing oil, free fatty acids and oil soluble toxic principles comprising comminuting the cottonseed, cooking the seed to increase the moisture content of the particles thereof and to soften the particles, mixing dry soda ash with the particles to convert the oil soluble toxic principles into water soluble partially detoxified principles whereby said principles adhere to the particles because of their affinity for the moisture thereof, removing the oil and free fatty acids from the cottonseed subsequent to the mixing of the soda ash therewith, mixing caustic soda with the oil to saponify the free fatty acids therein in a quantity sufficient to provide a slight excess of uncombined caustic soda, separating the soapstock thus formed and the excess caustic soda from the oil, mixing the soapstock and excess caustic soda with the residue of cottonseed particles, and maintaining the resultant mixture at a temperature of from approximately 210° F. to 230° F. for a period of approximately twenty minutes.

7. A process for forming feed for animals and poultry from cottonseed containing oil soluble impurities including color bodies, toxic principles, waxes, gums, free fatty acids and the like comprising mixing dry soda ash with previously cooked moist particles of comminuted cottonseed in a quantity sufficient to interact with the oil soluble impurities thereof to render said impurities water soluble so as to have an affinity for the moist seed particles, solvent extracting oil and free fatty acids from the seed particles by the passage of hexane through the seed particles to form a miscella of the hexane and the oil subsequent to the mixing of the soda ash with the cottonseed, removing the miscella from the residue of cottonseed particles, saponifying the free fatty acids contained in the oil by the admixture of caustic soda therewith, the caustic soda being present in a quantity sufficient to provide a slight excess after saponifying the fatty acids, separating the soapstock with minute quantities of hexane adherent thereto and the excess of caustic soda from the miscella, mixing the soapstock and adherent hexane and excess caustic soda with the residue of the cottonseed particles previously treated with the soda ash, maintaining the resultant mixture at a temperature of from approximately 210° F. to 230° F. for approximately twenty minutes, and vaporizing the hexane from the meal and soapstock.

8. A process for forming meal pellets edible by animals and poultry from cottonseed containing oil, free fatty acids and toxic principles comprising cooking comminuted cottonseed to soften the seed and render the particles thereof moist, mixing dry soda ash with the moist cooked seed whereby the soda ash interacts with the toxic principles rendering said principles water soluble so as to have an affinity for the moist particles, extracting the oil and free fatty acids from the cottonseed by means of a solvent therefor subsequent to the mixing of the soda ash with the seed, removing the extracted oil and solvent from the cottonseed residue containing the toxic principles interacted with the soda ash, saponifying the free fatty acids contained in the oil and solvent with a slight excess of caustic soda, removing the resultant soapstock and excess caustic soda from the oil and solvent with minute quantities of solvent adhering thereto, mixing the soapstock with the excess caustic soda and the solvent adhering thereto with the residue of the cottonseed, dehydrating the residue and soapstock to remove moisture and solvent therefrom, and pelletizing the resultant dehydrated residue and soapstock.

9. A process for forming meal edible by animals and poultry from cottonseed containing oil, free fatty acids and toxic principles comprising comminuting the cottonseed, cooking the comminuted cottonseed to soften the seed and render the particles thereof moist, mixing from .1% to 5% by weight of dry soda ash with the moist seed particles, extracting the oil and free fatty acids from the cottonseed subsequent to the mixing of the soda ash with the particles, mixing caustic soda with the extracted oil in a quantity sufficient to saponify substantially all of the free fatty acids of the oil with a slight excess of causic soda remaining, removing the soapstock thus formed from the oil together with the slight excess of caustic soda, mixing the soapstock and excess caustic soda with the residue of the cottonseed, and maintaining the resultant mixture at a temperature of from approximately 210° F. to 230° F. for at least about twenty minutes.

10. A process for forming meal edible by animals and poultry from cottonseed containing oil, free fatty acids and toxic principles comprising cooking comminuted cottonseed to soften the seed and render the particles thereof moist, mixing from .1% to 5% by weight of dry soda ash with the moist cooked seed particles whereby the soda ash interacts with the toxic principles rendering said principles water soluble so as to have an affinity for the moist particles, extracting oil from the cottonseed by passing hexane therethrough to form a miscella subsequent to the mixing of the soda ash with the cottonseed, removing the miscella from the cottonseed residue containing the toxic principles interacted with the soda ash, mixing caustic soda with the miscella in a quantity sufficient to saponify the free fatty acids thereof with a slight excess of caustic soda, removing the resultant soapstock from the miscella with minute quantities of solvent adhering thereto and with the excess of caustic soda, mixing from 1% to 8% by weight of the soapstock with solvent adhering thereto together with the excess caustic soda with the residue of the cottonseed, maintaining the resultant mixture at a temperature of approximately from 210° F. to 230° F.

under a pressure of approximately five pounds per square inch for a period of at least about twenty minutes, and subsequently dehydrating the mixture to remove the moisture and solvent therefrom.

11. In a process for forming meal edible by animals and poultry from cottonseed containing toxic principles involving cooking comminuted cottonseed and subsequently extracting oil from the cooked cottonseed; the step of mixing dry soda ash with moist cottonseed following the cooking thereof and prior to the extraction of the oil therefrom.

12. The process of claim 11 in which the dry soda ash is employed in approximately .1% to 5% by weight of the moist cottonseed.

13. In a process, for forming meal edible by animals and poultry from comminuted cottonseed particles containing toxic principles, involving cooking the cottonseed, extracting oil from the cooked cottonseed particles, saponifying the fatty acids of the extracted oil with caustic soda to form soapstock, and the application of said soapstock to the comminuted cottonseed particles from which the oil has previously been removed; the step of mixing dry soda ash with the moist cottonseed particles after cooking and prior to the extraction of the oil whereby the soda ash interacts with toxic principles of the cottonseed.

14. In a process for forming feed for animals and poultry from cottonseed containing toxic principles and including both comminuting and cooking the cottonseed, the steps of mixing dry soda ash with the comminuted cottonseed having moisture previously added thereto by the cooking whereby the soda ash reacts with toxic principles of the cottonseed, and extracting oil from the comminuted cottonseed subsequent to the mixing of dry soda ash therewith.

References Cited in the file of this patent

UNITED STATES PATENTS

| | | |
|---|---|---|
| 2,168,532 | McMath et al. | Aug. 8, 1939 |
| 2,458,679 | Buxton | Jan. 11, 1949 |
| 2,726,155 | King at al. | Dec. 6, 1955 |
| 2,746,864 | Pack et al. | May 22, 1956 |